United States Patent [19]

Williams

[11] Patent Number: 5,127,438
[45] Date of Patent: Jul. 7, 1992

[54] LONG LASTING FAUCET HAVING MINIMUM WEAR

[76] Inventor: Richard T. Williams, P.O. Box 39, Uwchland, Pa. 19480

[21] Appl. No.: 511,395

[22] Filed: Apr. 19, 1990

[51] Int. Cl.$^5$ .................... F16K 11/074; F16K 3/08
[52] U.S. Cl. ................. 137/625.31; 137/562; 4/678; 285/193
[58] Field of Search ............. 137/625.31, 562; 4/192, 4/193; 285/193

[56] References Cited

U.S. PATENT DOCUMENTS

| | | | |
|---|---|---|---|
| 1,556,241 | 10/1925 | Mueller | 285/193 |
| 4,502,165 | 3/1985 | Szemeredi et al. | 4/192 |
| 4,549,579 | 10/1985 | Bergmann | 137/625.31 X |
| 4,651,770 | 3/1987 | Denham et al. | 137/625.31 X |

*Primary Examiner*—Arnold Rosenthal
*Attorney, Agent, or Firm*—John F. A. Earley; John F. A. Earley, III

[57] ABSTRACT

A faucet with control mechanism for passing water through the faucet or for shutting the water off, which comprises ceramic discs having mating long-wearing highly polished faces that provide a water seal when the discs are in closed position, and have openings therein which provide a water passageway when the discs are in open position for axial flow, wherein the ceramic discs themselves form the passageway or pressure vessel which contains the flow and permits the use of a side-operated handle which attaches to a controller inside the faucet which is open to the atmosphere. A lower body portion has a threaded stem with a pair of opposed flat portions for admitting a split mounting washer without having to thread the washer on the threaded stem all the way from the bottom of the stem.

5 Claims, 5 Drawing Sheets

LONG LASTING FAUCET HAVING MINIMUM WEAR

BACKGROUND OF THE INVENTION

1. Field of the Invention

This invention relates to faucets, and more particularly concerns faucets which are long lasting and which have minimum wear, and particularly concerns faucets which utilize ceramic discs having highly polished mating surfaces that are rotatable relative to each other in order to turn on and turn off the faucet.

2. Description of the Prior Art

Faucets are old in the art, and there are many different types available. Many use resilient gaskets which wear out over the course of time and must be replaced, or the faucet leaks.

SUMMARY OF THE INVENTION

It is an object of this invention to provide a faucet which is long lasting and which has minimum wear, and does not have the disadvantages of the prior art because it does not depend on a resilient washer to provide a water seal, but instead depends on highly polished ceramic mating surfaces.

It is an object of this invention to provide faucet having water flow control apparatus in a faucet chamber, which control apparatus comprises a bottom ceramic disc with a highly polished upper face, with the bottom ceramic disc being fixed in position in the chamber, a second ceramic disc which has a polished lower face that is flush against the polished upper face of the lower disc, and a pan and handle which are attached to the second ceramic disc and control its rotation relative to the bottom ceramic disc. Both discs have openings therein which allow the passage of water when the openings in the two discs are aligned, and prevent the passage of water when the openings in the two discs are not aligned.

Resilient gasket rings are provided at the top and bottom of the chamber to urge the two discs together.

In a preferred embodiment of the invention, three ceramic discs are provided, with the upper and the lower discs being stationary in the chamber, and the second disc being rotatable by the handle and being located between the first and the third disc. The mating faces of the discs are highly polished to make relative rotation very easy, and to provide a water seal when the openings in the discs are not aligned.

DETAILED DESCRIPTION OF THE DRAWINGS

Turning now to the drawings, there is shown a long-lasting faucet 11 which has minimum wear because its bearing surfaces are made of highly polished ceramic materials. These ceramic materials also have the advantage of being essentially inert chemically, thereby avoiding leaching of lead (usually found in brass) or many other possible impurities.

Figures 1, 2:
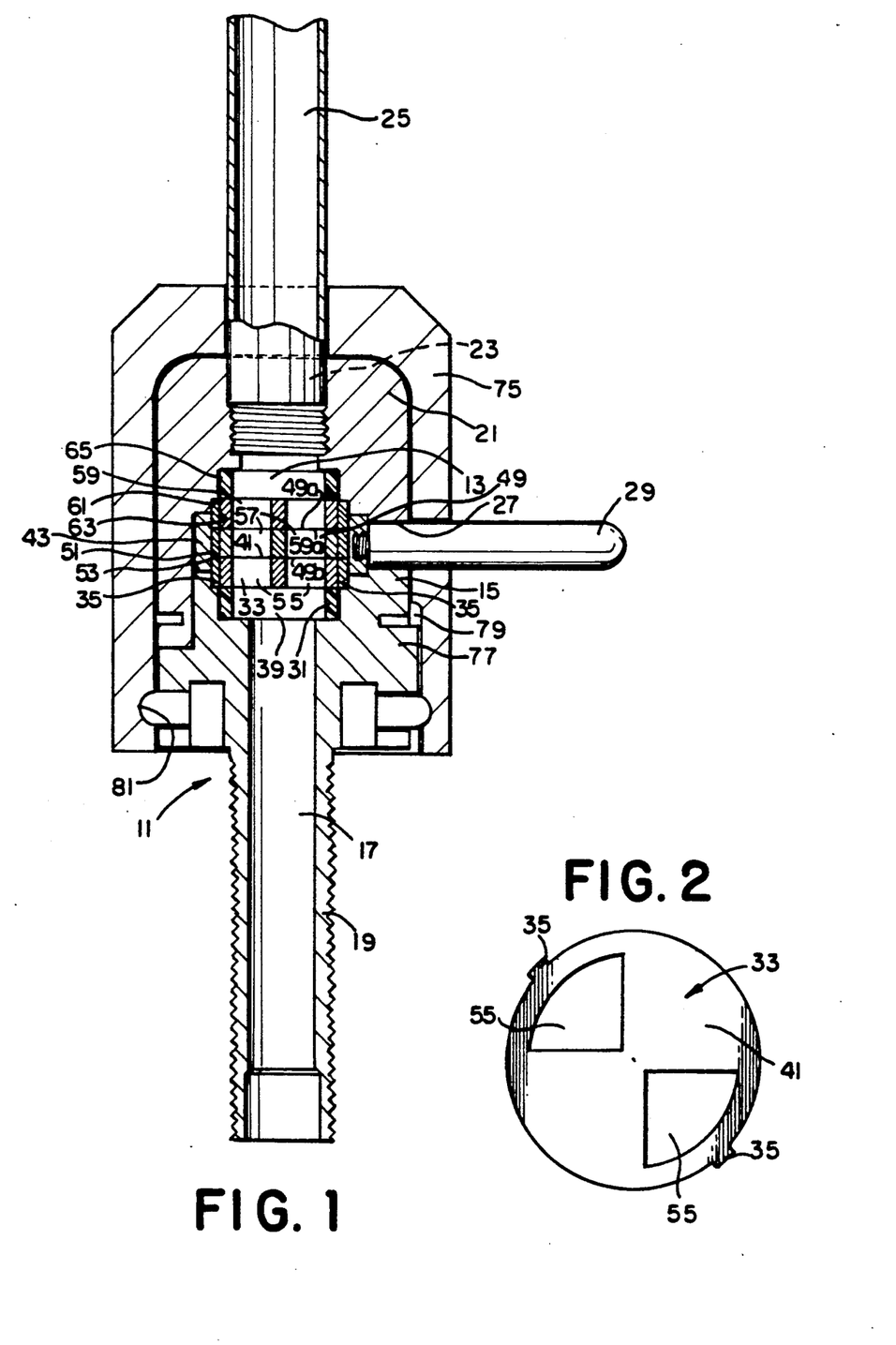
FIG. 1 is a view in vertical section of a faucet constructed in accordance with this invention and shows three ceramic discs in position in the chamber of the faucet.
FIG. 2 is a view in top plan of one of the discs, all of them being of the same construction, and shows the position of the disc ears and of the disc openings.

The faucet 11 comprises a chamber 13 having a lower body portion 15 with an intake conduit 17 that extends downwardly therefrom through a threaded stem 19. The chamber 13 also has an upper body portion 21 with an exit conduit 23 that extends upwardly therefrom to a spout 25.

A horizontal slot in the sidewall of chamber 13 forms a window 27 that opens the chamber 13 to the atmosphere. An operating handle 29 extends through the window 27, and handle 29 regulates the flow of water through the faucet 11 from full off to full on. The window 27 extends for 90° of rotation of handle 29.

Seated in the bottom of chamber 13 is a lower resilient gasket sealing ring 31. A lower ceramic disc 33 is seated on top of the lower gasket sealing ring 31, and in operation the lower gasket sealing ring 31 may exert upward pressure against the lower ceramic disc 33. Lower ceramic disc 33 is fixed in position against rotation but is movable axially. Outwardly extending ears 35 fix the lower ceramic disc 33 against rotation and extend into vertical grooves 37 which are formed inside the sidewall 39 of the lower body portion 15 of chamber 13.

Lower ceramic disc 33 has a highly polished upper face 41.

Figure 4:
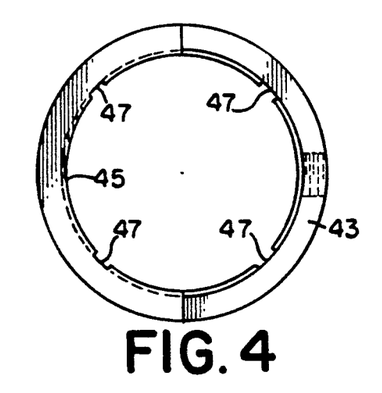
FIG. 4 is a view in top plan and shows a pan which is a component of the faucet.
Figure 5:
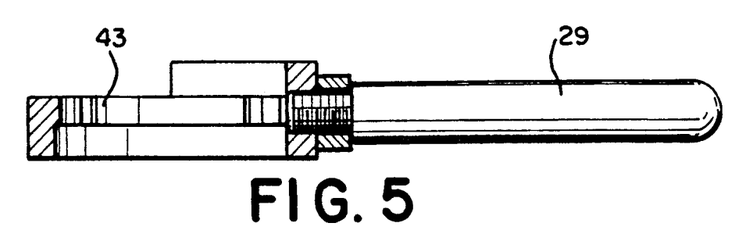
FIG. 5 is a view in side elevation, partly in section, of the combination of the pan with an operating handle for turning the faucet on and off.

A pan 43 is seated in the chamber 13 above the lower ceramic disc 33 and is provided with an inner lip 45 (FIG. 4) which has four axial grooves 47 located 90° apart. Handle 29 is attached to pan 43 and extends outwardly through window 27 where it may be grasped by anyone who wants to turn the faucet 11 off or on.

A second ceramic disc 49 is seated in the pan 43, and is rotatable with the pan. Handle 29 and pan 43 control the rotation of the second ceramic disc 49 which has ears 51 extending outwardly from its outer sidewall 53. The ears 51 seat in the axial grooves 47 of the pan 43 so that the disc 49 rotates with the pan 43. However, the ears 51 in axial grooves 47 permit axial movement of the disc 49 so that axial pressure may be exerted against the top of second ceramic disc 49 and the bottom of lower ceramic disc 33 to urge the two discs together.

Second ceramic disc 49 has a highly polished upper face 49a, and a highly polished lower face 49b which abuts against the highly polished upper face 41 of lower disc 33 to create a seal that prevents passage of water through the faucet 11 when the handle 29 is turned off. Handle 29 extends from pan 43 through window 27 where it can be reached and operated by anyone wishing to turn the faucet 11 on or off.

In order to pass water through the faucet 11, lower ceramic disc 33 is provided with openings 55 therein, and second ceramic disc 49 is provided with openings 57 so that when openings 55 and 57 are in alignment, the discs 33, 49 permit water to flow axially through the faucet, and when openings 55, 57 are not aligned, the discs 33, 49 create a seal that prevents the water from flowing axially through the discs 33, 49 and through the faucet 11.

A third ceramic disc 59 is mounted on top of the second ceramic disc 49 and is provided with a highly polished lower face 59a that contacts the upper face 49a of the second disc 49 to provide smooth long-wearing bearing surfaces between the second disc 49 and the third disc 59. Third disc 59 is provided with axial ears 61 that seat in axial grooves 63 in the upper body portion 21 of the chamber 13 to prevent rotation of the third ceramic disc 59.

An upper resilient gasket sealing ring 65 is seated on top of the third disc 59. Resilient gasket sealing rings 65 and 31 exert axial pressure on the discs 33, 49, and 59 to urge them together to create a better water seal in the faucet 11. The highly polished contact surfaces of the discs help create that seal, and the highly polished surfaces assure minimum wear so that the discs are long-lasting without leaking. Both the lower ceramic disc 33 and the third ceramic disc 59 are non-rotating. Only second disc 49 is rotatable so that the only movement between the discs is the rotating movement between highly polished ceramic faces 41 and 49b, and between highly polished ceramic faces 49a and 59a.

The construction of the faucet 11 provides for unobstructed straight-line axial flow of the liquid through the faucet 11 with minimum pressure loss, minimum wear, and minimum erosion of the inner surfaces of the faucet 11.

Figure 3:
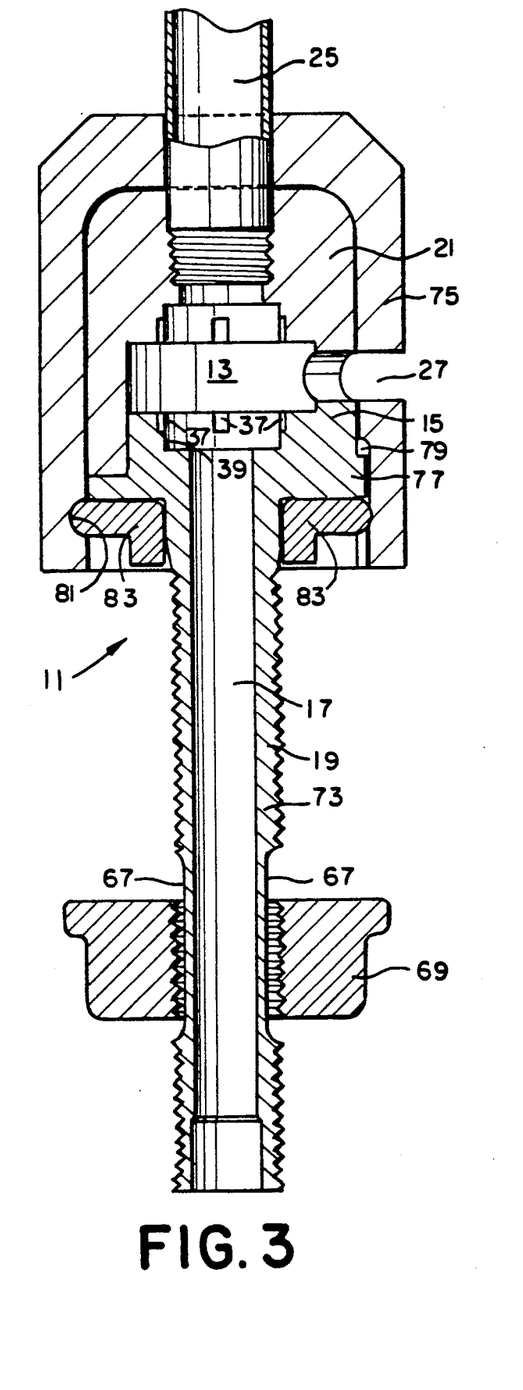
FIG. 3 is a view in vertical section of the faucet shown in FIG. 1, but shows the faucet with the discs removed, and shows a pair of flat portions on the stem of the lower body portion, and shows a split mounting nut being inserted onto the stem.
Figure 8:
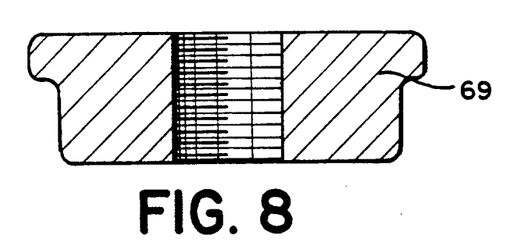
FIG. 8 is a view in vertical cross section of the split mounting nut.
Figure 9:
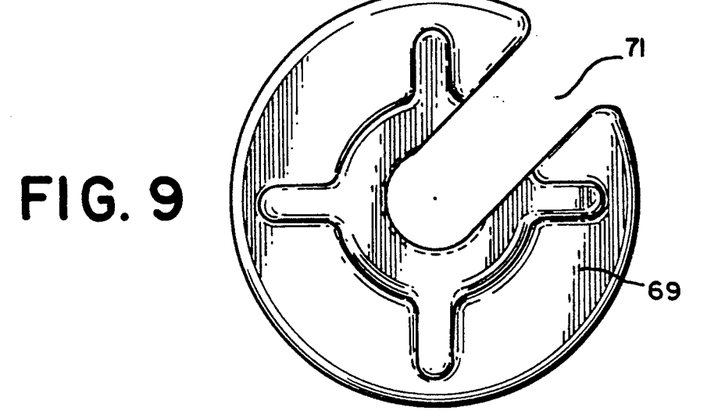
FIG. 9 is a view in bottom plan of the split mounting nut 69 of FIG. 8.

It is often difficult to mount a faucet onto the counter of a sink because of the limited space below the sink counter. To overcome this difficulty, the lower body portion 15 of faucet 11 is provided with a threaded stem 19 that extends downwardly and is provided with threads that accept a mounting nut 69. However, because of the limited space beneath a sink, it may be difficult to screw the mounting nut onto the threaded stem from the bottom of the stem, especially if the stem has a pipe extending therefrom which has been pre-attached to the stem. To overcome this problem, threaded stem 19 is provided with a pair of flat portions 67 on opposite sides of the stem. Mounting nut 69 is provided with a radial opening 71 (FIG. 9) that extends from the center of the nut to the outer edge to permit attaching the nut 69 to the stem 19 with a sideways motion at the flat portions 67 of the stem 19 and then to be rotated to engage the threads 73 of the stem which are located above the flats 67, without being forced to thread the nut 69 all the way from the bottom of the stem 19. With this structure, a pipe may be pre-attached to the bottom of the stem 19 before inserting lower body portion 15 into the space beneath a sink counter.

To assemble the faucet 11 on a sink counter, the stem 19, together with any pre-attached pipe, is inserted into a hole in the counter from the top of the counter until the bottom of lower body portion 15, which extends outwardly from the stem 19, rests against the edge portions of the hole in the countertop. Upper body portion 21 is attached to lower body portion 15, and spout 25 is attached to exit conduit 23. Spout 25 is provided with a decorative cover 75 which may be made of DuPont's CORIAN material. The faucet 11 is held in place by screwing the split mounting nut 69 onto stem 19 after inserting the nut 69 around the stem 19 with a sideways motion that passes nut opening 71 around flat portions 67 of the stem 19.

Faucet 11 is stylish and beautiful and provides the highest quality and lowest maintenance. The sapphire hard ceramic discs have been machined to 5 micron smoothness to provide a surface flatness which is measured in helium light bands. These ceramic discs are chemically inert and highly resistant to scaling and corrosion and provide a combination of low pressure loss, essentially no maintenance, and classic styling. Faucet 11 features a "quarter turn" fully adjustable flow rate and may be installed for either left or right handed operation.

In order to control rotational positioning between the beauty cover 75 and lower body portion 15, the lower body portion 15 is provided with a male key 77 that extends outwardly and seats in a female keyway 79 which is formed in the interior sidewall of cover 75.

In order to lock the cover 75 onto the assembled lower and upper body portions 15, 21, a circumferential groove 81 is machined into the inside sidewall of the cover 75 near the bottom of the cover.

Figure 6:
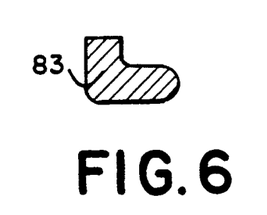
FIG. 6 is a view in vertical section of a body stop member which is a component of the faucet.
Figure 7:
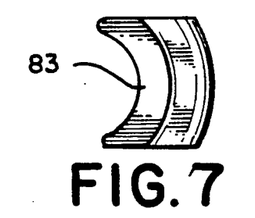
FIG. 7 is a view in top plan of the body stop member shown in FIG. 6.

After placing the cover 75 over the lower and upper body sub-assembly, two resilient body stop members 83 are cammed into the space between the stem and the circumferential groove 81 where the body stop members expand into the groove 81 and wedge between the groove 81 and the stem 19 to lock the cover 75 in place. This wedging action of the two body stop members 83 exerts radial forces which maintain the cover 75 in locked position without additional mechanical fasteners. Further, the countertop of the sink contacts the bottom of the body stop members and the bottom of the cover 75 to capture the body stop members 83 and hold them in place.

One of the advantages of faucet 11 is its flexibility of presentation. For example, the cover 75 can may made of DuPont CORIAN material, or it may be made of deep drawn metal, or injection molded synthetic plastic material, or wood, or any other material, because it is not contacted by the water. The outer cover 75 may be made to match any decor which is desired, including kitchen sinks, bar sinks, and cabinets.

Lower body portion 15 including stem 19, and upper body portion 21, are made of inert material, thereby avoiding leaching of lead, which may be found in brass, or many other possible impurities.

The straight, in-line flow of liquid through faucet 11 minimizes pressure drop.

Long life of faucet 11 is assured by the ceramic-to-ceramic sliding surfaces of the discs, as compared to matching a ceramic surface with a sliding surface of other materials.

The long life of faucet 11 is further enhanced by end-loading the ceramic discs by the forces exerted by lower gasket sealing ring 31 and upper resilient sealing ring 65 that compensate for any slight wear of the sealing faces of the discs.

The operating force required to turn the faucet 11 on or off is low because the only force required is that necessary to overcome the friction between highly polished ceramic surfaces between the discs. If it were necessary to compress an elastomeric seal to turn on a faucet, a greater force would be required to turn on a faucet.

Turning now to the embodiment of the invention disclosed in FIGS. 10 through 13, there is shown apparatus for turning a faucet on and off which comprises a lower body portion 85, with an intake conduit 87 extending downwardly therefrom, and an upper body portion 89, with an exit conduit 91 extending upwardly, which form a chamber 93. A horizontal slot in the sidewall of chamber 93 forms a window 95 that extends for 90° and opens the chamber 93 to the atmosphere.

Figure 10:
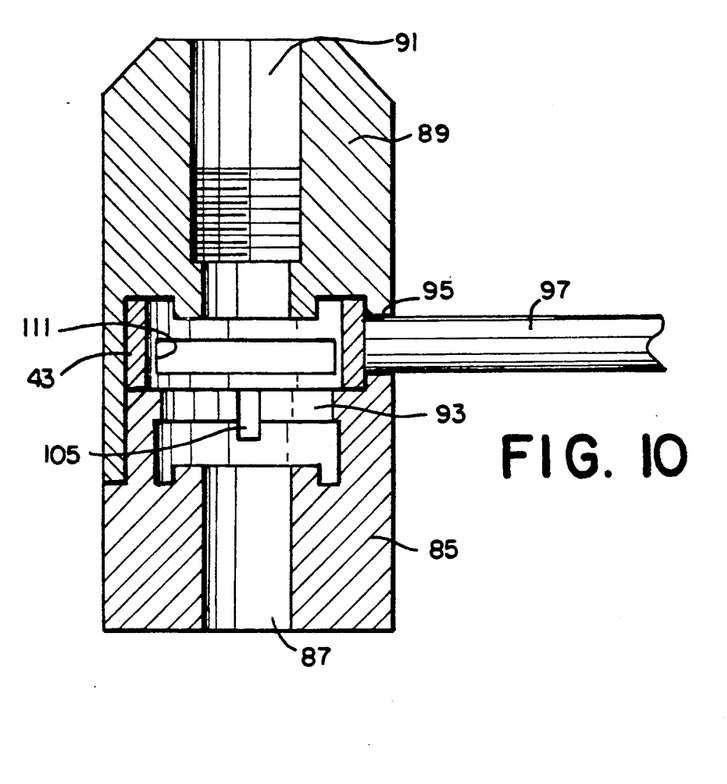
FIG. 10 is a partial view in vertical section of another embodiment of the invention and shows the upper and lower body portions which form the chamber of the faucet.
Figure 11:
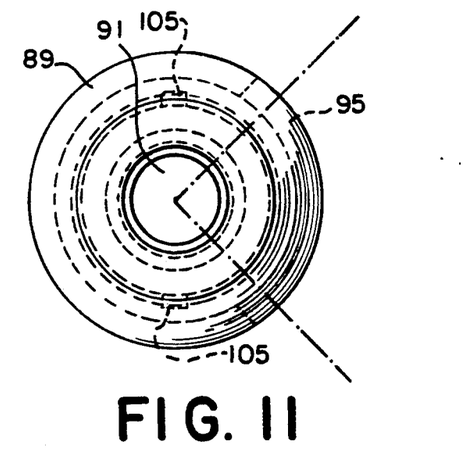
FIG. 11 is a view in top plan of the faucet apparatus shown in FIG. 10.
Figures 12, 12A, 12B:
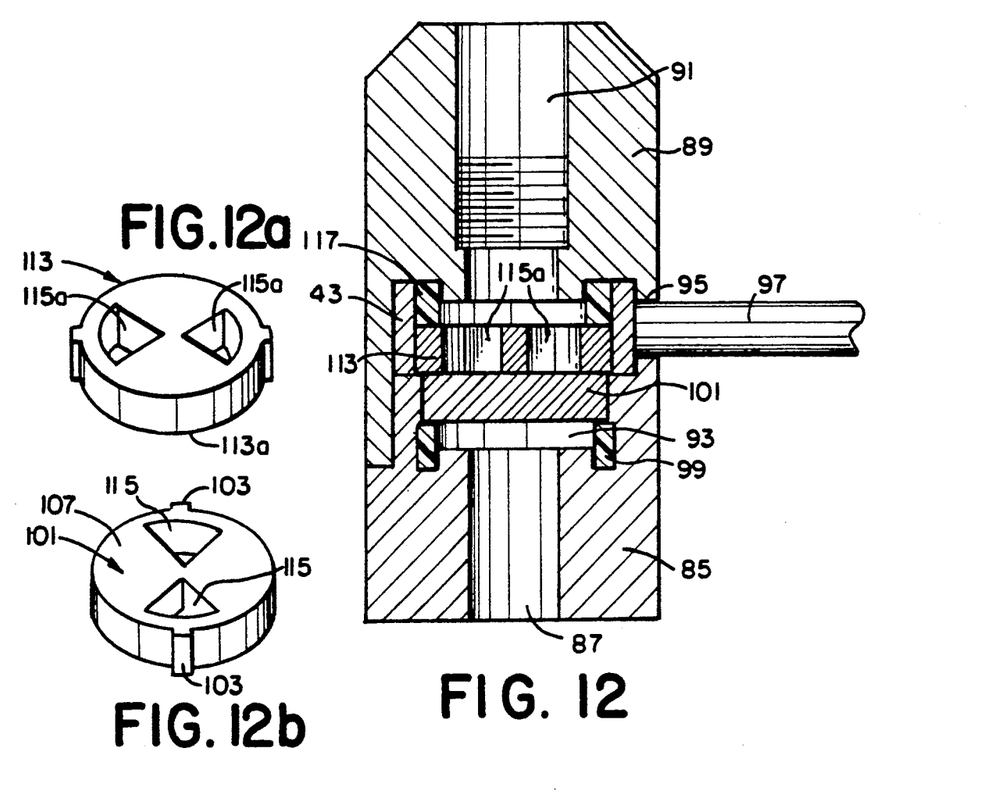
FIG. 12 is a view in vertical section of the faucet apparatus shown in FIGS. 10 and 11, but shows the apparatus with two discs, two gasket rings, and a pan and handle inserted.
FIG. 12a is a view in perspective of the upper disc shown in FIG. 12.
FIG. 12b is a view in perspective of the lower disc shown in FIG. 12.
Figure 13:
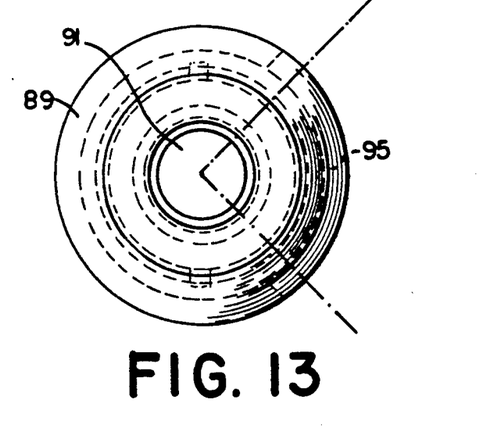
FIG. 13 is a view in top plan of the apparatus shown in FIG. 12.

An operating handle 97 extends through the window 95 and regulates the flow of water in the faucet from full off to full on.

A lower resilient gasket sealing ring 99 is seated in the bottom of the chamber 93, and a lower ceramic disc 101 is seated on top of the lower gasket sealing ring 99 and is fixed in position against rotation by outwardly extending ears which extend into vertical grooves 105 which are formed inside the sidewall of the lower body portion 85 of the chamber 93. Lower ceramic disc 101 is, however, movable axially.

Lower ceramic disc 101 is provided with a highly polished upper face 107.

A pan 43 is seated in the chamber 93 above the lower ceramic disc 101 and is provided with an inner lip 111 which has four axial grooves located 90° apart. Handle 97 is attached to pan 43 and extends outwardly through the window 95.

A second ceramic disc 113 is seated in pan 43 and rests on top of lower disc 101. The handle 97 and pan 43 rotate together and rotate the second ceramic disc 113. Handle 97 and pan 43 control the rotation of second ceramic disc 113, but permit axial movement of the disc 113 in four axial grooves which are formed in the inner lip 111 of the pan. Second ceramic disc 113 is provided with ears that extend outwardly from its outer sidewall and ride in the axial grooves in the lip 111 of the pan.

Second ceramic disc 113 is provided with a highly polished lower face 113a. The lower ceramic disc 101 has openings 115 therein and the second ceramic disc 113 is provided with openings 115a so that when openings 115, 115a are in alignment, they permit water to flow axially through the discs 101, 113 and when openings 115, 115a non-aligned, the discs prevent water from flowing axially through the discs.

The polished mating faces 107, 113a of the two ceramic discs form a water-tight seal that prevents flow of water through the faucet when the disc openings 115, 115a are not aligned.

An upper resilient gasket sealing ring 117 sits between the top surface of second disc 113 and the top wall of chamber 93, and the resiliency of the sealing rings 99 and 117 urge the polished faces of the discs together.

The lower ceramic disc 101 is non-rotating. Turning of the handle 97 produces rotational movement between the highly polished ceramic faces 107 and 113a of the two ceramic discs, and creates little wear so that the faucet is long lasting without leaking.

I claim:

1. A faucet 11 comprising
   a chamber 13 having a lower body portion 15 with an intake conduit 17 extending downwardly therefrom through a threaded stem 19,
   said chamber 13 having an upper body portion 21 with an exit conduit 23 extending upwardly therefrom to a spout 25,
   a horizontal slot in the sidewall of the chamber 13 which forms a handle window 27 that extends for 90° and which opens the chamber 13 to the atmosphere,
   an operating handle 29 extending through the window 27 which regulates the flow of water in the faucet 11 from full off to full on,
   a lower resilient gasket sealing ring 31 in the bottom of the chamber 13,
   a lower ceramic disc 33 seated on top of the lower gasket sealing ring 31 and fixed in position against rotation, but movable axially, by outwardly extending ears 35 which extend into vertical grooves 37 inside the sidewall 39 of the lower body portion 15 of the chamber 13,
   said lower ceramic disc 33 having a highly polished upper face 41,
   a pan 43 seated in the chamber 13 on top of the lower ceramic disc 33 and having an inner lip 45 with four axial grooves 47 located 90° apart,
   said handle 29 being attached to pan 43 and extending outwardly through window 27,
   a second ceramic disc 49 seated in the pan 43,
   said handle 29 and pan 43 controlling the rotation of the second ceramic disc but permitting axial movement of the disc 49 in the four axial grooves 47,
   said second ceramic disc 49 having ears 51 extending outwardly from its outer sidewall 53, which ears 51 seat in the axial grooves 47 of the pan 43,
   said second ceramic disc 49 having a highly polished upper face 49a and a highly polished lower face 49b,
   the lower ceramic disc 33 having openings 55 therein and the second ceramic disc 49 having openings 57 so that when openings 55, 57 are in alignment they permit water to flow axially through the discs 33, 49 and when openings 55, 57 are non-aligned the discs 33, 49 prevent water from flowing axially through the discs,
   the polished mating faces 41, 49b of the two ceramic discs 33, 49 forming a water seal that prevents flow of water through the faucet 11 when the disc openings 55, 57 are not aligned,
   a third ceramic disc 59 mounted on top of the second ceramic disc 49 and having a highly polished lower face 59a to contact the upper face 49a of the second disc 49 to provide smooth long-wearing bearing surfaces between the second disc 49 and the third disc 59,
   said third disc 59 having axial ears 61 that seat in axial grooves 63 in the upper body portion 21 of the chamber 13 to prevent rotation of the third ceramic disc 59, an upper resilient gasket sealing ring 65 which sits between the top surface of third disc 59 and the top wall of chamber 13, both the lower ceramic disc 33 and the third ceramic disc 59 being non-rotating which allows radial movement between highly polished ceramic faces 41,49b and 49a, 59a of the three ceramic discs only, whereby providing for unobstructed straight-line axial flow of the water through the faucet 11 with minimum pressure loss, minimum wear, and minimum erosion of the inner surfaces of the faucet 11, lower body portion 15 having a threaded stem 19 extending downwardly therefrom to permit mounting the faucet 11 on the counter of a sink, a pair of flat portions 67 on opposite sides of the threaded stem 19, a split mounting nut 69 having a radial opening 71 extending from the center to the outer edge of the nut 69 to permit attaching the nut 69 to the stem 19 with a sideways motion at the flat portions 67 of the stem 19 to engage the threads 73 of the stem 19 without having to thread the nut 69 from the bottom of the stem 19, whereby a pipe may be pre-attached to the bottom of the stem 19 before inserting the lower body portion 15 into the space beneath a sink counter, and the mounting nut 69 may thereafter be easily threaded onto the stem 19 to mount the faucet 11 onto the counter 2. In a faucet apparatus for turning the faucet on and off, comprising a lower body portion 85 with an intake conduit 87 extending downwardly therefrom and an upper body portion 89 with an exit conduit 91 extending upwardly therefrom, to form a chamber 93, a horizontal slot in the sidewall of the chamber 93 which forms a handle window 95 that extends for 90 ° and which opens the chamber 93 to the atmosphere, an operating handle 97 extending through the window 95 which regulates the flow of water in the faucet from full off to full on, a lower resilient gasket sealing ring 99 seated in the bottom of the chamber 93, a lower ceramic disc 101 seated on top of the lower gasket sealing ring 99 and fixed in position against rotation, but movable axially, by outwardly extending ears 103 which extend into vertical grooves 105 inside the sidewall of the lower body portion 85 of the chamber 93, said lower ceramic disc 101 having a highly polished upper face 107, a pan 43 seated in the chamber 93 above the lower ceramic disc 101 and having an inner lip 111 with four axial grooves located 90° apart, said handle 97 being attached to pan 43 and extending outwardly through window 95, a second ceramic disc 113 seated in the pan 43, said handle 97 and pan 43 controlling the rotation of the second ceramic disc 113 but permitting axial movement of the disc 113 in the four axial grooves, said second ceramic disc 113 having ears extending outwardly from its outer sidewall, which ears seat in axial grooves in the lip 111 of the pan 43, said second ceramic disc 113 having a highly polished lower face 113a, the lower ceramic disc 101 having openings 115 therein and the second ceramic disc 113 having openings 115a so that when openings 115, 115a are in alignment they permit water to flow axially through the discs 101,113 and when openings 115, 115a are non-aligned the discs prevent water from flowing axially through the discs, the polished mating faces 107, 113a of the two ceramic discs forming a water seal that prevents flow of water through the faucet when the disc openings 115, 115a are not aligned, an upper resilient gasket sealing ring 117 which sits between the top surface of second disc and the top wall of chamber 93, the lower ceramic disc 101 being non-rotating which allows rotational movement between highly polished ceramic faces 107, 113a of the two ceramic discs only, whereby providing for unobstructed straight-line axial flow of the water through the faucet with minimum pressure loss, minimum wear, and minimum erosion of the inner surfaces of the faucet.

3. In a faucet 11, apparatus for turning the faucet on and off, comprising a lower body portion 15 with an intake conduit 17 extending downwardly therefrom, and an upper body portion 21 with an exit conduit 23 extending upwardly therefrom to form a chamber 13, a horizontal slot in the sidewall of the chamber 13 which forms a handle window 27 that extends for 90 ° and which opens the chamber 13 to the atmosphere, an operating handle 29 extending through the window 27 which regulates the flow of water in the faucet 11 from full off to full on, a lower resilient gasket sealing ring 31 seated in the bottom of the chamber 13, a lower ceramic disc 33 seated on top of the lower gasket sealing ring 31 and fixed in position against rotation, but movable axially, by outwardly extending ears 35 which extend into vertical grooves 37 inside the sidewall 39 of the lower body portion 15 of the chamber 13, said lower ceramic disc 33 having a highly polished upper face 41, a pan 43 seated in the chamber 13 above the lower ceramic disc 33 and having an inner lip 45 with four axial grooves 47 located 90 ° apart, said handle 29 being attached to pan 43 and extending outwardly through window 27, a second ceramic disc 49 seated in the pan 43 said handle 29 and pan 43 controlling the rotation of the second ceramic disc but permitting axial movement of the disc 49 in the four axial grooves 47, said second ceramic disc 49 having ears 51 extending outwardly from its outer sidewall 53, which ears 51 seat in the axial grooves 47 of the pan 43, said second ceramic disc 49 having a highly polished upper face 49a and a highly polished lower face 49b, the lower ceramic disc 33 having openings 55 therein and the second ceramic disc 49 having openings 57 so that when openings 55, 57 are in alignment they permit water to flow axially through the discs 33, 49 and when openings 55, 57 are non-aligned the discs 33, 49 prevent water from flowing axially through the discs, the polished mating faces 41, 49b of the two ceramic discs 33, 49 forming a water seal that prevents flow of water through the faucet 11 when the disc openings 55, 57 are not aligned, a third ceramic disc 59 mounted on top of the second ceramic disc 49 and having a highly polished lower face 59a to contact the upper face 49a of the second disc 49 to provide smooth long-wearing bearing surfaces between the second disc 49 and the third disc 59, said third disc 59 having axial ears 61 that seat in axial grooves 63 in the upper body portion 21 of the chamber 13 to prevent rotation of the third ceramic disc 59, an upper resilient gasket sealing ring 65 which sits between the top surface of third disc 59 and the top wall of chamber 13, both the lower ceramic disc 33 and the third ceramic disc 59 being non-rotating which allows radial movement between highly polished ceramic faces 41, 49b, and 49a, 59a of the three ceramic discs only, whereby providing for unobstructed straight-line axial flow of the water through the faucet 11 with minimum pressure loss, minimum wear, and minimum erosion of the inner surfaces of the faucet 11.

4. Apparatus for turning a faucet on and off, comprising a faucet lower body portion 15 with an intake conduit extending downwardly therefrom, a faucet upper body portion connected to the upper body portion to form a chamber with an exit conduit extending from the upper body portion, control means in the chamber for passing water through the faucet or shutting this water off, handle means connected to the control means to regulate the flow of water in the faucet from full off to full on, lower body portion 15 having a threaded stem 19 extending downwardly therefrom to permit mounting the faucet 11 on the counter of a sink, a pair of flat portions 67 on opposite sides of the threaded stem 19, a split mounting nut 69 having a radial opening 71 extending from the center to the outer edge of the nut 69 to permit attaching the nut 69 to the stem 19 with a sideways motion at the flat portions 67 of the stem 19 to engage the threads 73 of the stem 19 without having to thread the nut 69 from the bottom of the stem 19, whereby a pipe may be pre-attached to the bottom of the stem 19 before inserting the lower body portion 15 into the space beneath a sink counter, and the mounting nut 69 may thereafter be easily threaded onto the stem 19 to mount the faucet 11 onto the counter.

5. Apparatus for turning a faucet on and off, comprising a faucet lower body portion 15 with an intake conduit extending downwardly therefrom, a faucet upper body portion connected to the upper body portion to form a chamber with an exit conduit extending from the upper body portion, control means in the chamber for passing water through the faucet or shutting this water off, handle means connected to the control means for regulating the flow of water in the faucet from full off to full on, lower body portion 15 having a threaded stem 19 extending downwardly therefrom to permit mounting the faucet 11 on the counter of a sink, threadless portion means formed on the threaded stem 19 for permitting attachment of a split mounting nut 69 to the stem 19, a split mounting nut 69 having a radial opening 71 extending from the center of the outer edge of the nut 69 to permit attaching the nut 69 to the stem 19 with a sideways motion at the threadless portion means formed on the stem 19 to engage the threads 73 of stem 19 without having to thread the nut 69 from the bottom of the stem 19, whereby a pipe may be pre-attached to the bottom of the stem 19 before inserting the lower body portion 15 into the space beneath a sink counter, and the mounting nut 69 may thereafter be easily threaded onto the stem 19 to mount the faucet 11 onto the counter.

* * * * *